United States Patent Office 3,629,430
Patented Dec. 21, 1971

3,629,430
ISOXAZOLE FUNGICIDAL COMPOSITIONS AND METHODS OF USE
Yukiyoshi Takahi, Shiga-ken, and Kazuo Tomita and Hidehiko Oka, Tokyo, Japan, assignors to Sankyo Company Limited, Tokyo, Japan
No Drawing. Filed Feb. 10, 1969, Ser. No. 798,160
Claims priority, application Japan, Feb. 13, 1968, 43/9,068
Int. Cl. A01n 9/22, 9/28
U.S. Cl. 424—272                    4 Claims

ABSTRACT OF THE DISCLOSURE

Agricultural fungicidal compositions which comprise a fungicidally effective amount of an isoxazole derivative having the formula

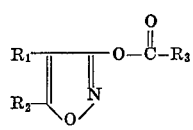

wherein $R^1$ is hydrogen atom, a halogen atom or an alkyl group of 1 to 3 carbon atoms; $R_2$ is hydrogen atom or an alkyl group of 1 to 3 carbon atoms; and $R_3$ is an alkoxy group of 1 to 5 carbon atoms or an aryl group which contains 6 to 10 carbon atoms, the hydrogen atom on one of more ring carbons of which may be substituted with alkyl of 1 to 5 carbon atoms, alkoxy of 1 to 3 carbon atoms, nitro, halogen or methylenedioxy, and an agriculturally-acceptable carrier. The present fungicidal composition can be utilized for combatting a wide range of pathogenic fungi causing plant diseases, especially those caused by various pathogenic fungi belonging to the genera Fusarium, Pythium, Rhizoctonia, Phytophthora and the like.

---

This invention relates to an agricultural fungicidal composition and a method for combatting various pathogenic fungi causing plant diseases.

More particularly, it relates to an agricultural fungicidal composition which comprises a fungicidally effective amount of an isoxazole derivative having the formula

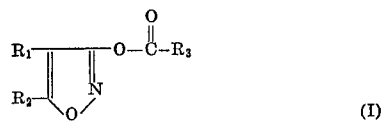  (I)

wherein $R_1$ is hydrogen atom, a halogen atom or an alkyl group of 1 to 3 carbon atoms, $R_2$ is hydrogen atom or an alkyl group of 1 to 3 carbon atoms and $R_3$ is an alkoxy group of 1 to 5 carbon atoms or an aryl group which contains 6 to 10 carbon atoms, the hydrogen atom on one or more ring carbon atoms of which may be substituted with alkyl of 1 to 5 carbon atoms, alkoxy of 1 to 3 carbon atoms, nitro, halogen or methylenedioxy, and a fungicidally-acceptable carrier. It also relates to a method for combatting pathogenic fungi which comprises treating the infested plants or the plant to be protected with a fungicidally effective amount of the abovementioned isoxazole derivative (I).

In the above Formula I, the group $R_1$ may be illustrated by hydrogen, methyl, ethyl, n-propyl, i-propyl, chlorine, bromine, fluorine or iodine, the group $R_2$ may be illustrated by hydrogen, methyl, ethyl, n-propyl or i-propyl and the group $R_3$ may be illustrated by methoxy, ethoxy, n-propoxy, i-propoxy, n-butoxy, tert.-butoxy, n-pentoxy, phenyl, naphthyl, o-, m- or p-tolyl, o-, m- or p-nitrophenyl, o-, m- or p-chlorophenyl, o-, m- or p-tert.-butylphenyl, o-, m- or p-tert.-butoxyphenyl, 2,4-dichlorophenyl, 2,3,4,5,6 - pentachlorophenyl, 2,3 - dimethoxyphenyl, or 3,4-methylenedioxyphenyl.

Previously, it was disclosed in the art, for example, by I. Awai et al. in French Patent No. 1,446,728 granted on June 13, 1966 that some isoxazole derivatives, particularly those having the formula

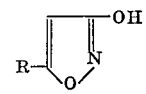  (II)

wherein R is hydrogen, an alkyl group, a dialkoxymethyl group of 1 to 5 carbon atoms are effective for combatting certain types of soil-borne pathogenic fungi.

However, such prior fungicidal isoxazoles are found to have some disadvantages of showing fungicidal activity against only limited types of soil-borne diseases, especially those caused by Fusarium and Pythium fungi and of being not so much effective against other soil-borne pathogenic fungi such as those belonging to the genera Rhizoctonia and Phytophthora and also of not showing satisfactorily fungicidal activity against various pathogenic fungi which will attack the ground parts of plants.

Now, as a result of our further extensive investigations on fungicidal activity of many isoxazole derivatives, it has been unexpectedly found that the isoxazole derivatives of the above Formula I exhibit more potent fungicidal activity against not only soil-borne pathogenic fungi belonging to the genera Fusarium and Phythium but also those fungi belonging to the genera Rhizoctonia and Phytophthora, without any degree of phytotoxicity even if applied in a considerably large amount, and they also show excellent and durable fungicidal activity as foliar fungicide for the treatment and prevention of a wide range of plant diseases with favourable growth promoting action on the host plant, as compared with the abovementioned prior fungicidal isoxazole derivatives.

It is accordingly an object of this invention to provide an agricultural fungicidal composition which comprises a fungicidally effective amount of the isoxazole of the above Formula I and an agriculturally-acceptable carrier.

It is another object of this invention to provide a method for combatting pathogenic fungi which comprises treating the infested plants or the plants to be protected with a fungicidally effective amount of the isoxazole derivative of the above Formula I.

These and other objects of this invention will be apparent from the following detailed description of this invention.

The isoxazole derivatives of the above Formula I are all novel compounds unknown in the prior art. These novel isoxazole compounds (I) can be easily prepared by reacting a 3-hydroxyisoxazole derivative having the formula

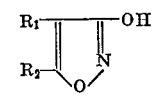  (III)

wherein $R_1$ and $R_2$ are as defined above with an acid halide having the formula

  (IV)

wherein $R_3$ is as defined above and X is chlorine or bromine, if necessary in the presence of an acid binding agent, e.g. caustic alkali, a tertiary amine and the like.

Representative examples of the active isoxazole derivatives (I) employed in this invention and some embodiments of the preparation of said isoxazole derivatives are given hereinbelow only for the purpose of illustration.

(1) 3-benzoyloxy-5-methylisoxazole (M.P. 39° C.);
(2) 3-(4-methylbenzoyloxy) - 5 - methylisoxazole (M.P. 85–85.5° C.);
(3) 3 - (2 - methylbenzoyloxy)-5-methylisoxazole (M.P. 66.5–67.0° C.);
(4) 3 - (3 - methylbenzoyloxy)-5-methylisoxazole (B.P. 155–160° C./0.9 mm. Hg);
(5) 3 - (4 - nitrobenzoyloxy) - 5-methylisoxazole (M.P. 120–121° C.);
(6) 3 - (2,4 - dichlorobenzoyloxy) - 5-methylisoxazole M.P. 74–75° C.);
(7) 3 - (3 - methylbenzoyloxy)-4-chloro-5-methylisoxazole (M.P. 63.5–65° C.);
(8) 3 - (4 - methoxybenzoyloxy) - 5-methylisoxazole (M.P. 85.5–86.5° C.);
(9) 3-(2 - methylbenzoyloxy)isoxazole (B.P. 135–140° C./0.9 mm. Hg);
(10) 3 - (4 - tert.-butylbenzoyloxy) - 5-methylisoxazole (M.P. 85.5–86.5° C.);
(11) 3 - (2,3 - dimethoxybenzoyloxy)-5-methylisoxazole (M.P. 63.5–65.5° C.);
(12) 3 - (3,4-methylenedioxybenzoyloxy)-5-methylisoxazole (M.P. 117.5° C.);
(13) 3 - (2 - methylbenzoyloxy) - 4,5-dimethylisoxazole (B.P. 140–150° C./0.3 mm. Hg);
(14) 3 - (2,3,4,5,6 - pentachlorobenzoyloxy) - 5-methylisoxazole (M.P. 128–129° C.);
(15) 3 - ethoxycarbonyloxyisoxazole (B.P. 85–90° C./0.4 mm. Hg);
(16) 3 - isobutoxycarbonyloxy - 5 - methylisoxazole (B.P. 146–149° C./0.3 mm. Hg);
(17) 3 - methoxycarbonyloxy - 5-methylisoxazole (B.P. 110–115° C./3 mm. Hg);
(18) 3 - ethoxycarbonyloxy - 4,5-dimethylisoxazole (B.P. 130° C./0.45 mm. Hg);
(19) 3 - ethoxycarbonyloxy-5-methylisoxazole (B.P. 125–130° C./3 mm. Hg);
(20) 3 - β - naphthoyloxy-5-methylisoxazole (M.P. 74.5–75° C.);
(21) 3 - α - naphthoyloxy - 5-methylisoxazole (M.P. 88–89° C.);
(22) 3 - (4 - chlorobenzoyloxy)-5-methylisoxazole (M.P. 96–98° C.); and
(23) 3 - (2 - chlorobenzoyloxy)-5-methylisoxazole (M.P. 75–76° C.).

PREPARATION A 3-benzoyloxy-5-methylisoxazole

To a solution of 4.95 g. of 3-hydroxy-5-methylisoxazole in 30 ml. of pyridine was added dropwise under ice cooling a solution of 7.0 g. of benzoyl chloride in 30 ml. of pyridine. After completion of the dropwise addition, the reaction mixture was allowed to rise to room temperature and stirred at that temperature for 2 hours. Then, the whole reaction mixture was poured into 600 ml. of a cooled aqueous hydrochloric acid solution. The resulting mixture was extracted into benzene and the extract was washed successively with 3% aqueous hydrochloric acid, water, 3% aqueous sodium bicarbonate and then saturated aqueous sodium chloride and dried over anhydrous sodium sulfate. Then, the benzene was distilled off under reduced pressure and the residue was recrystallized from n-hexane to give the title compound as colorless needles melting at 38–39° C.

PREPARATION B 3-(4-methoxybenzoyloxy)-5-methylisoxazole

To a suspension of 1.2 g. of sodium salt of 3-hydroxy-5-methylisoxazole in 30 ml. of acetonitrile was added dropwise with stirring and cooling a solution of 1.0 g. of p-methoxybenzoyl chloride in 10 ml. of acetonitrile. After completion of the dropwise addition, the resulting mixture was allowed to stand overnight at room temperature, the insoluble substance which precipitated in situ was removed by filtration and washed with benzene. The filtrate and the washings were combined and the solvent was distilled off under reduced pressure. The residue was recrystallized from n-hexane to give the title compound as colorless crystals melting at 85.5–86.5° C.

The active compound (I) used in the fungicidal composition according to this invention may be conveniently formulated by known procedures and used in various forms including liquids, dusts, granules and wettable powders etc.

Liquids may be prepared by dissolving the active compound in an agriculturally-acceptable liquid carrier, i.e. a suitable solvent with or without one or more of known adjuvants commonly employed in the art such as emulsifying agents, wetting agents, or dispersing agents. Suitable solvents include water, alcohols such as methanol or ethanol, acetone, benzene, toluene, xylenes, solvent naphtha, petroleum ether, the mixture thereof and the like. Suitable adjuvants may be any of those which is ordinarily employed in the art, and include, for example, the condensation products of alkylene oxides with phenols or organic acids, alkylarylsulfonates, dialkyl sulfosuccinate, polyoxyethylene ether or ester derivatives of alcohols or acids and the like.

Dusts and granules may be prepared by mixing said active compound in and on an inert agriculturally-acceptable solid carrier by a conventional procedure. Suitable solid carriers for use in the composition of this invention include, for example, talc, pyrophylite, kieselguhr, clay, bentonite, diatomaceous earth, kaolin, precipitated chalk and the like.

Wettable powders may be prepared by mixing the said active compound with one or more of the aforementioned solid carriers and suitable dispersing agents. Suitable dispersing agents include, for examples, those aforementioned adjuvants such as alkylbenzenesulfonates, lignosulfonates or polyoxyalkylene glycol ethers or esters.

The concentration of the active compound in the composition of this invention may normally be from about 0.1 to about 95% by weight, and preferably from about 0.5 to about 70% by weight, based upon the total weight of the composition, although the amount of the active ingredient employed will largely depend upon such factors as the type and severity of diseases, the form of a composition or the specific active compound. It should be, however, understood that the amount of an active compound employed is to be not a critical feature of this invention. Two or more of said active ingredients may be conveniently incorporated into the agricultural fungicidal composition of this invention.

The agricultural fungicidal composition of this invention may also include other known fungicidal agents e.g. pentachloronitrobenzene, tetramethylthiuram disulfide, dimethylaminobenzene diazo sodium sulfonate, N-trichloromethylthio - 4 - cyclohexane - 1,2 - dicarboxyimide, trichloro-2-nitropropane, 5-ethoxy-3-trichloromethyl - 1,2,4-thiadiazole and the like; insecticidal agents, e.g. 1,4,5,6,7,8,8-heptachloro - 3α - 4,7,7α-tetrahydro-4,7-methanoindene, benzenehexachloride, 1,1,1-trichloro-2,2-bis(p-chlorophenyl)ethane, O,O-dimethyl S-(N-methylcarbamoylmethyl)phosphorodithioate, O,O-diethyl S-2-(ethylthio) ethyl phosphorodithioate and the like; fertilizers, and the like.

In order to illustrate the excellent fungicidal activity of the active isoxazole derivative (I) according to this invention, the comparative testings and the results thereof are given hereinbelow:

EXPERIMENT 1

Test for preventive and curative effects of the active isoxazole derivative according to this invention against soft rot in kidney beans Method and material.—As a host plant were employed young kidney bean seedlings which had been previously grown on a nursery in a greenhouse. For each test run were used two test spots, each containing about 30 growing seedlings. Host plants were inoculated with *Sclerotinia sclerotiorum*, which had been incubated at 28° C. for about 2 weeks in a laboratory, by admixing an adequate amount of said pathogenic fungus with a suitable amount of shallow surface soil. On 2nd and 10th days after inoculation with the pathogenic fungus, the test compound as indicated hereinbelow was applied to the host spot in the form of a liquid preparation in an amount of 100 l./10 a., respectively.

The above liquid preparation was made by mixing and pulverizing the test compound 50% by weight, a mixture of clay and diatomaceous earth (1:1) 47% by weight and polyoxyethylene nonylphenyl ether 1% by weight, diluting the resulting wettable powder with water to a preparation having the concentration as given hereinbelow and then adding to the diluted preparation 0.03% by weight of a spreader ["Gramin" (registered trade name), a mixture of polyoxyethylene dodecyl ether, polyoxyethylene aryl ether sulfonic acid and abietic acid polyalcohol ester manufactured and sold by Sankyo Company Ltd., Japan].

After 20 days of the inoculation, host plants were visually observed, both killed plant and plant with a brown-colored stem were rated as "diseased" and then the average percentage of "diseased" rating was calculated, based upon the number of the "diseased" plants in two spots.

Results.—The results are summarized in the following Table I.

TABLE I

| Test compound [1] | Concentration of the test compound in the liquid preparation (γ/ml.) | Diseased rating (percent) | Phytotoxicity |
|---|---|---|---|
| 1 | 1,000 | 1.5 | — |
|   | 300 | 7.8 | — |
| 3 | 1,000 | 0.0 | — |
|   | 300 | 4.5 | — |
| 5 | 1,000 | 0.7 | — |
|   | 300 | 6.5 | — |
| 6 | 1,000 | 1.7 | — |
|   | 300 | 7.8 | — |
| 7 | 1,000 | 1.3 | — |
|   | 300 | 9.3 | — |
| 11 | 1,000 | 3.0 | — |
|   | 300 | 5.8 | — |
| 12 | 1,000 | 1.9 | — |
|   | 300 | 6.7 | — |
| 16 | 1,000 | 1.0 | — |
|   | 300 | 7.5 | — |
| 18 | 1,000 | 0.5 | — |
|   | 300 | 6.5 | — |
| 19 | 1,000 | 0.0 | — |
|   | 300 | 5.3 | — |
| 21 | 1,000 | 2.5 | — |
|   | 300 | 7.3 | — |
| Control (3-hydroxy-5-methyl-isoxazole). | 1,000 | 26.5 | — |
|   | 300 | 68.7 | — |
| Non-treated | | 79.3 | — |

[1] Test compound is indicated by means of the number as given to the isoxazole derivatives listed hereinabove, for convenience and implification.

EXPERIMENT 2

Test for preventive and curative effect of the active isoxazole derivative according to this invention against tomato late blight Method and material.—The test compound as indicated hereinbelow was applied to tomatoes with 5–6 leave period by spraying as a liquid preparation made as in the above Experiment 1 in an amount of 40 ml. for two test pots containing said growing host plants. After air-drying, host plants were inoculated by spraying with spores of potato late blight (*Phytophthora infestans*). The inoculated host plants were placed for 24 hours in a room maintained at 20° C. and at a relative humidity of above 95% and then removed into a greenhouse at 25° C. After 5 days, total area of the lesions in upper three leaves was measured and then average area of the lesion per leaf was calculated.

Results.—The results are summarized in the following Table II.

TABLE II

| Test [1] compound | Concentration of the test compound in the liquid preparation (γ/ml.) | Average area of lesion (percent) | Phytotoxicity |
|---|---|---|---|
| 1 | 1,000 | 2.1 | — |
|   | 300 | 13.6 | — |
| 3 | 1,000 | 1.0 | — |
|   | 300 | 9.6 | — |
| 6 | 1,000 | 2.1 | — |
|   | 300 | 14.3 | — |
| 10 | 1,000 | 4.5 | — |
|   | 300 | 13.2 | — |
| 16 | 1,000 | 3.9 | — |
|   | 300 | 11.7 | — |
| 19 | 1,000 | 2.5 | — |
|   | 300 | 13.3 | — |
| Control (3-hydroxy-5-methyl-isoxazole). | 1,000 | 59.3 | — |
|   | 300 | 83.4 | — |
| Non-treated | | 100.0 | — |

[1] Cf. the footnote in the above Table I.

EXPERIMENT 3

Test for preventive and curative effects against soilborne diseases

Method and material.—The following pathogenic fungi, which had been previously cultivated in bran at 28° C. for 2 weeks, were uniformly admixed with a separate portion of test soil, respectively.

*Rhizoctonia vagum,*
*Fusarium oxysporum,* and
*Pythium aphanidermatum.*

Then, the test compound as indicated hereinbelow was uniformly admixed with the test soil at the dose rate indicated, in the form of a dust.

The test spot as prepared above was sown with cucumber seeds. After 10 and 20 days of the seeding, visual investigations were made on damping-off of cucumber seedlings and the numbers of killed seedlings were checked on a total of about 120 seedlings in 2 test spots, respectively.

Results.—The results are summarized in the following Tables III, IV and V.

TABLE III
Fungicidal effect against *Rhizoctonia vagum*

| Test [1] compound | Dose rate (g./10 a.) | Number of killed seedlings after seeding | | Phyto-toxicity |
|---|---|---|---|---|
| | | 10th day | 20th day | |
| 2 | 3,000 | 0 | 0 | — |
| | 1,000 | 0 | 1 | — |
| | 300 | 1 | 5 | — |
| 3 | 3,000 | 0 | 0 | — |
| | 1,000 | 0 | 0 | — |
| | 300 | 0 | 2 | — |
| 4 | 3,000 | 0 | 0 | — |
| | 1,000 | 0 | 0 | — |
| | 300 | 1 | 3 | — |
| 7 | 3,000 | 0 | 0 | — |
| | 1,000 | 0 | 1 | — |
| | 300 | 0 | 5 | — |
| 10 | 3,000 | 0 | 0 | — |
| | 1,000 | 0 | 2 | — |
| | 300 | 1 | 7 | — |
| 12 | 3,000 | 0 | 1 | — |
| | 1,000 | 0 | 1 | — |
| | 300 | 2 | 6 | — |
| 14 | 3,000 | 0 | 0 | — |
| | 1,000 | 1 | 1 | — |
| | 300 | 2 | 4 | — |
| 16 | 3,000 | 0 | 1 | — |
| | 1,000 | 1 | 3 | — |
| | 300 | 2 | 5 | — |
| 18 | 3,000 | 0 | 0 | — |
| | 1,000 | 0 | 2 | — |
| | 300 | 1 | 6 | — |
| 19 | 3,000 | 0 | 0 | — |
| | 1,000 | 1 | 1 | — |
| | 300 | 3 | 6 | — |
| Control (3-hydroxy-5-methylisoxazole) | 3,000 | 18 | 36 | — |
| | 1,000 | 32 | 69 | — |
| | 300 | 59 | 93 | — |
| Non-treated | | 100 | 120 | — |

[1] Cf. the footnote in the above Table I.

TABLE IV
Fungicidal effect against *Fusarium oxysporum*

| Test [1] compound | Dose rate (g./10 a.) | Number of killed seedlings after seeding | | Phyto-toxicity |
|---|---|---|---|---|
| | | 10th day | 20th day | |
| 1 | 3,000 | 0 | 0 | — |
| | 1,000 | 0 | 1 | — |
| | 300 | 1 | 8 | — |
| 3 | 3,000 | 0 | 0 | — |
| | 1,000 | 0 | 0 | — |
| | 300 | 0 | 2 | — |
| 6 | 3,000 | 0 | 2 | — |
| | 1,000 | 3 | 5 | — |
| | 300 | 7 | 13 | — |
| 8 | 3,000 | 0 | 0 | — |
| | 1,000 | 0 | 2 | — |
| | 300 | 3 | 5 | — |
| 9 | 3,000 | 0 | 0 | — |
| | 1,000 | 0 | 1 | — |
| | 300 | 2 | 6 | — |
| 11 | 3,000 | 0 | 0 | — |
| | 1,000 | 0 | 3 | — |
| | 300 | 1 | 7 | — |
| 13 | 3,000 | 0 | 0 | — |
| | 1,000 | 0 | 0 | — |
| | 300 | 1 | 5 | — |
| 15 | 3,000 | 0 | 0 | — |
| | 1,000 | 0 | 2 | — |
| | 300 | 1 | 4 | — |
| 17 | 3,000 | 0 | 0 | — |
| | 1,000 | 0 | 1 | — |
| | 300 | 0 | 5 | — |
| 19 | 3,000 | 0 | 0 | — |
| | 1,000 | 1 | 2 | — |
| | 300 | 1 | 3 | — |
| 21 | 3,000 | 0 | 2 | — |
| | 1,000 | 1 | 7 | — |
| | 300 | 5 | 15 | — |
| Control (3-hydroxy-5-methylisoxazole) | 3,000 | 0 | 2 | ++ |
| | 1,000 | 0 | 34 | — |
| | 300 | 12 | 51 | — |
| Non-treated | | 42 | 117 | — |

[1] Cf. the footnote in the above Table I.

TABLE V
Fungicidal effect against *Pythium aphanidermatum*

| Test [1] compound | Dose rate (g./10 a.) | Number of Killed seedlings after seeding | | Phyto-toxicity |
|---|---|---|---|---|
| | | 10th day | 20th day | |
| 1 | 3,000 | 0 | 0 | — |
| | 1,000 | 0 | 2 | — |
| | 300 | 4 | 9 | — |
| 3 | 3,000 | 0 | 0 | — |
| | 1,000 | 0 | 0 | — |
| | 300 | 0 | 2 | — |
| 4 | 3,000 | 0 | 0 | — |
| | 1,000 | 2 | 4 | — |
| | 300 | 4 | 11 | — |
| 7 | 3,000 | 0 | 0 | — |
| | 1,000 | 0 | 3 | — |
| | 300 | 2 | 9 | — |
| 10 | 3,000 | 0 | 0 | — |
| | 1,000 | 0 | 4 | — |
| | 300 | 5 | 10 | — |
| 12 | 3,000 | 0 | 0 | — |
| | 1,000 | 1 | 3 | — |
| | 300 | 3 | 7 | — |
| 13 | 3,000 | 0 | 0 | — |
| | 1,000 | 0 | 1 | — |
| | 300 | 1 | 3 | — |
| 15 | 3,000 | 0 | 0 | — |
| | 1,000 | 0 | 0 | — |
| | 300 | 1 | 2 | — |
| 16 | 3,000 | 0 | 0 | — |
| | 1,000 | 0 | 1 | — |
| | 300 | 1 | 4 | — |
| 18 | 3,000 | 0 | 0 | — |
| | 1,000 | 0 | 2 | — |
| | 300 | 1 | 3 | — |
| Control (3-hydroxy-5-methylisoxazole) | 3,000 | 0 | 2 | — |
| | 1,000 | 4 | 11 | — |
| | 300 | 24 | 41 | — |
| Non-treated | | 96 | 119 | — |

[1] Cf. the footnote in the above Table I.

The following examples are given only for the purpose of illustrating some preferred embodiments of the agricultural fungicidal compositions and methods for combatting pathogenic fungi according to this invention. All parts are given by weight.

EXAMPLE 1

Dust

The following ingredients were uniformly mixed and pulverized to make a dust.

| | Parts |
|---|---|
| 3-benzoyloxy-5-methylisoxazole | 5 |
| Clay-talc (1:1) | 94 |
| Red iron oxide | 0.5 |
| Whitecarbon | 0.5 |

The dust thus made was plowed into soil in sugar beet or vegetable fields at the dose rate of 10 kg./10 a. before seeding or planting for the preventive and curative treatment of damping-off.

EXAMPLE 2

Emulsifiable concentrate

The following ingredients were throughly mixed to make an emulsifiable concentrate.

| | Parts |
|---|---|
| 3-(4-methylbenzoyloxy)-5-methylisoxazole | 30 |
| Acetone-benzene-ethanol | 63 |
| "Newcol" (registered trademark of an emulsifying agent manufactured and sold by Nihon Nyukazai K. K., Japan) | 7 |

The emulsifiable concentrate thus made was diluted with 500–1000 times volume of water and applied to sugar beets, vegetables or rice by pouring in each trench at rates of 2–3 l./m.² before seeding or planting for the preventive and curative treatment of damping-off.

The emulsifiable concentrate was also diluted with 500–1000 times volume of water and applied to crops by pouring in the part near the root thereof at rates of 2–3 l./m.² at intervals of 7–10 days during the growing period.

EXAMPLE 3

Wettable powder

The following ingredients were uniformly mixed and pulverized to make a wettable powder.

| | Parts |
|---|---|
| 3-(3-methylbenzoyloxy)-5-methylisoxazole | 50 |
| Clay-diatomaceous earth (1:1) | 47 |
| Polyoxyethylene nonylphenyl ether | 2 |
| Polyvinyl alcohol | 1 |

The wettable powder thus made was diluted with 500–1000 times volume of water and applied to sugar beets or vegetable for the preventive and curative treatment of damping-off and to cucumber melons and gourd family for Fusarium wilt by pouring in each trench or the part near the root at rates of 2–3 l./m.² during the growing period or before and after seeding or planting.

The wettable powder was also diluted with 1000–2000 times volume of water and applied to kidney beans by spraying at rates of 100 l./10 a. for the preventive and curative treatment of soft rot.

What is claimed is:

1. An agricultural fungicidal composition which comprises a fungicidally effective amount of a compound having the formula

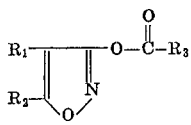

wherein $R_1$ is hydrogen, halogen or alkyl of 1 to 3 carbon atoms, $R_2$ is hydrogen or alkyl of 1 to 3 carbon atoms and $R_3$ is alkoxy of 1 to 5 carbon atoms, phenyl, naphthyl, o-, m-, or p-tolyl, o-, m- or p-nitrophenyl, o-, m- or p-chlorophenyl, o-, m- or p-tert.-butylphenyl, o-, m- or p-tert.-butoxyphenyl, p-methoxyphenyl, 2,4-dichlorophenyl, 2,3,4,5,6-pentachlorophenyl, 2,3-dimethoxyphenyl, or 3,4-methylenedioxphenyl, and an agriculturally-acceptable carrier, said fungicidally effective amount being about 0.5–70% by weight, based upon the total weight of the composition.

2. The composition according to claim 1 wherein said compound is selected from the group consisting of 3-(2-methylbenzoyloxy)-5-methylisoxazole,
3-(3-methylbenzoyloxy)-5-methylisoxazole,
3-(4-methylbenzoyloxy)-5-methylisoxazole,
3-(4-methoxybenzoyloxy)-5-methylisoxazole,
3-(4-tert.-butylbenzoyloxy)-5-methylisoxazole,
3-(2,3-dimethoxybenzoyloxy)-5-methylisoxazole,
3-(3,4-methylenedioxybenzoyloxy)-5-methylisoxazole,
3-isobutoxycarbonyloxy-5-methylisoxazole,
3-methoxycarbonyloxy-5-methylisoxazole and
3-ethoxycarbonyloxy-5-methylisoxazole.

3. A method for combatting pathogenic fungi which comprises treating said fungi with a fungicidally effective amount of a compound having the formula

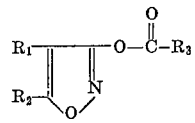

wherein $R_1$ is hydrogen, halogen or alkyl of 1 to 3 carbon atoms, $R_2$ is hydrogen or alkyl of 1 to 3 carbon atoms and $R_3$ is alkoxy of 1 to 5 carbon atoms, phenyl, naphthyl, o-, m- or p-tolyl, o-, m- or p-nitrophenyl, o-, m- or p-chlorophenyl, o-, m- or p-tert.-butylphenyl, o-, m- or p-tert.-butoxyphenyl, p-methoxyphenyl, 2,4-dichlorophenyl, 2,3,4,5,6-pentachlorophenyl, 2,3-dimethoxyphenyl, or 3,4-methylenedioxphenyl.

4. The method according to claim 3 wherein said compound is selected from the group consisting of 3-(2-methylbenzoyloxy)-5-methylisoxazole,
3-(3-methylbenzoyloxy)-5-methylisoxazole,
3-(4-methylbenzoyloxy)-5-methylisoxazole,
3-(4-methoxybenzoyloxy)-5-methylisoxazole,
3-(4-tert.-butylbenzoyloxy)-5-methylisoxazole,
3-(2,3-dimethoxybenzoyloxy)-5-methylisoxazole,
3-(3,4-methylenedioxybenzoyloxy)-5-methylisoxazole,
3-isobutoxycarbonyloxy-5-methylisoxazole,
3-methoxycarbonyloxy-5-methylisoxazole and
3-ethoxycarbonyloxy-5-methylisoxazole.

References Cited

UNITED STATES PATENTS

| 3,207,761 | 9/1965 | Bay | 424—272 |
| 3,366,537 | 1/1968 | Woolf | 424—272 |
| 3,410,860 | 11/1968 | Haber et al. | 424—272 |

FOREIGN PATENTS

| 1,446,728 | 6/1966 | France | 424—272 |

ALBERT T. MEYERS, Primary Examiner

N. A. DREZIN, Assistant Examiner

U.S. Cl. X.R.

260—307.8; 424—270